Jan. 25, 1944.  G. A. MAAG  2,340,195
AIRPLANE CONSTRUCTION
Filed April 23, 1941  2 Sheets-Sheet 1

INVENTOR
GEORGE A. MAAG.
BY
Blair, Curtis + Hayward
ATTORNEYS

Jan. 25, 1944.  G. A. MAAG  2,340,195
AIRPLANE CONSTRUCTION
Filed April 23, 1941  2 Sheets-Sheet 2
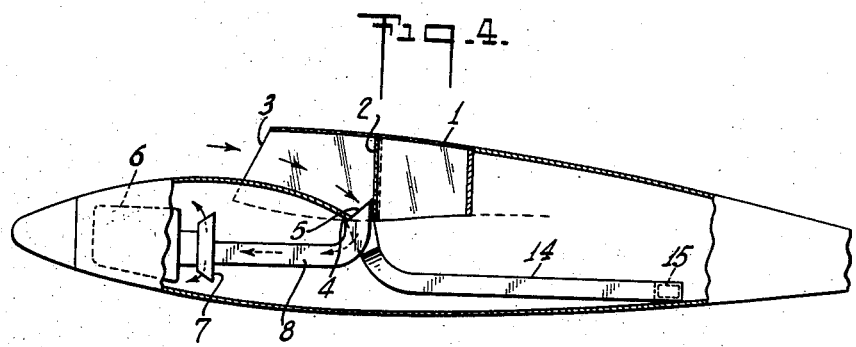
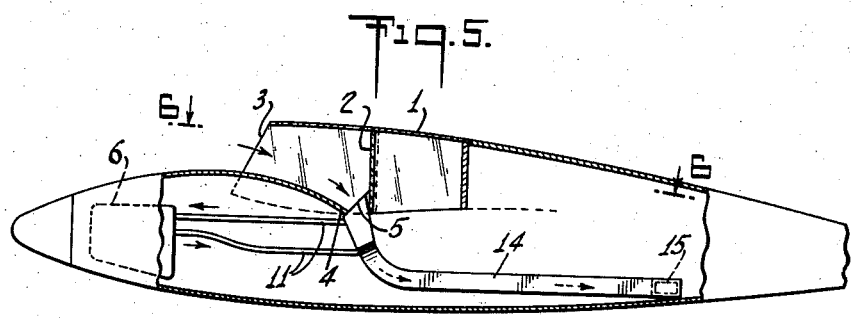
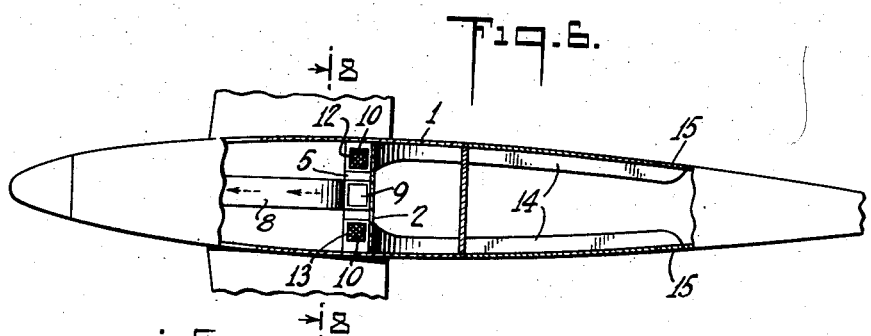
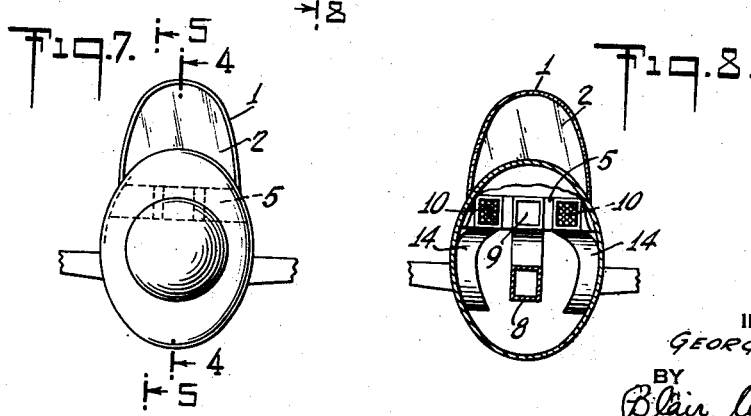
INVENTOR
GEORGE A. MAAG.
BY
Blair, Curtis + Hayward
ATTORNEYS Patented Jan. 25, 1944

2,340,195

UNITED STATES PATENT OFFICE 2,340,195

AIRPLANE CONSTRUCTION

George A. Maag, Stratford, Conn.

Application April 23, 1941, Serial No. 389,838

3 Claims. (Cl. 244—53)

This invention relates to an airplane.

In the present construction of the fuselage of many airplanes, the air which is used for cooling, such as of the motor, and for supplying the supercharger as well as for other purposes is gathered by scoops located in the nose of the fuselage, usually beneath the motor.

The result of this of course is a disturbance of the streamlining of the fuselage, with the consequent disturbance of the air flow and an increased air resistance. In many airplanes of this type the windshield in front of the pilot is located at the forward end of the canopy and additionally presents air resistance.

The present invention is directed to the reduction of the air resistance and to the supplying of the necessary air to the various apparatii located within the fuselage, wings and other parts of the structure.

In the drawings:

Figure 4 is a horizontal sectional view partly broken away on line 4—4 of Figure 3;

Figure 5 is a similar view on the line 5—5 of Figure 3;

Figure 6 is a horizontal sectional view on line 6—6 of Figure 5;

Figure 7 is a front elevation of the airplane; and

Figure 8 is a vertical sectional view on line 8—8 of Figure 7.

Figure 1:
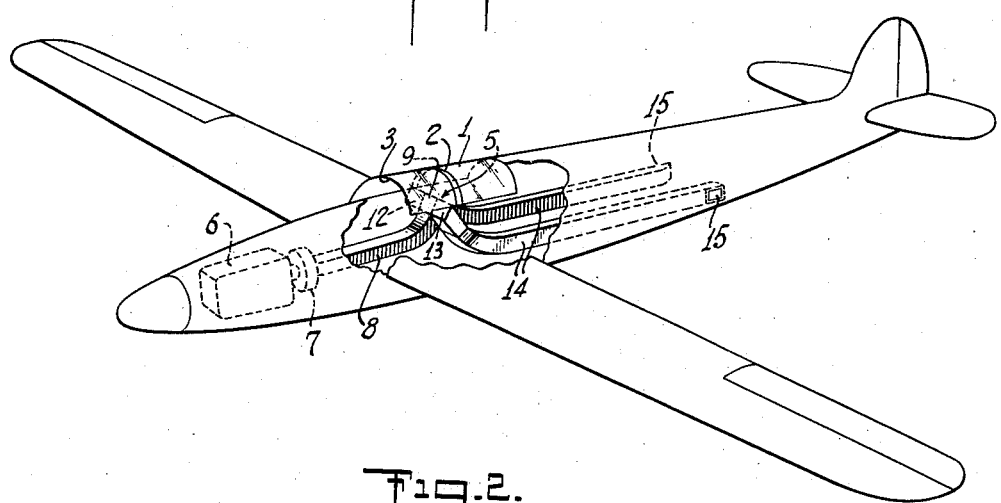
Figure 1 is a perspective view of an airplane showing an embodiment of the invention incorporated therein.
Figure 2:
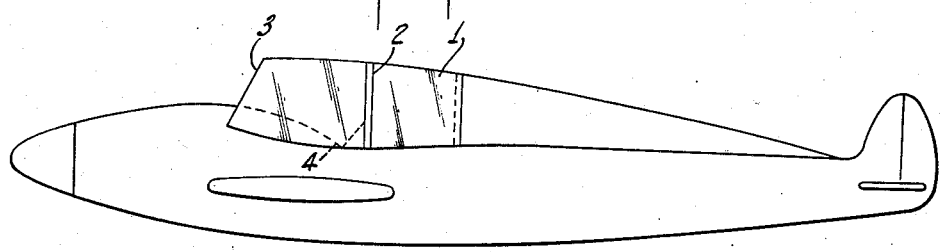
Figure 2 is a side elevation of the airplane.

In the embodiment of the invention disclosed in the drawings the canopy 1, which is preferably transparent and which is provided with an inset windshield 2 located in front of the pilot, terminates at 3 forming an air scoop between its forward end and the windshield.

The forward upper portion of the fuselage terminates at 4 short of the windshield 2.

The space between the end 4 of the fuselage and the windshield 2 is bridged by a partition 5 which is provided with openings for the reception of the air that is scooped in by the scoop 3, as will later appear.

In the illustrative embodiment of the invention I have indicated that the air that is scooped in by the forward scoop end of the canopy is used for the purpose of supplying the motor supercharger and for reducing the temperature of the motor cooling fluid, but this air may also be used for supplying the carburetor, supercharger, intercooler, ventilation and other purposes.

In Figure 4 of the drawings the motor is diagrammatically represented.

A duct 8 extents from an opening 9 in the partition 5 and conducts the air from the scoop 3 to the supercharger.

Figure 3:
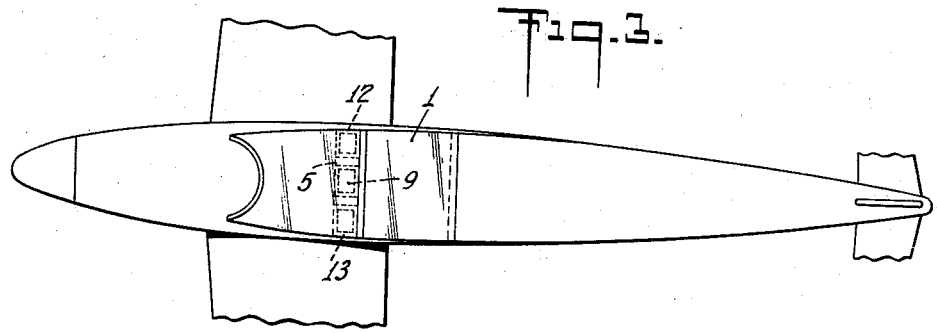
Figure 3 is to top elevation.

In Figures 3, 6 and 8 I have shown a dual motor cooling apparatus which includes a honeycombed radiator 10. The motor cooling fluid is conducted back and forth from the motor to the radiators by the conduits 11 and circulates through the radiators in the usual manner. The air tubes of the radiators communicate with the openings 12 and 13 in the partition 5 so that the air scooped in by the forward scoop end of the canopy 3 will pass through the air passages of the radiators.

Leading from these radiators are conduits 14 which extend rearwardly from the radiators along the fuselage and discharge at 15 so that the air escape will not only not disturb the air flow but will actually improve the flow. Moreover these ducts may discharge at other points such as through the wings.

Of course the partition 5 may be supplied with other ducts for supplying air to the other apparatus or to the fuselage, or the air may be gathered by one duct and then separated for the various apparatii. I, therefore, do not wish to be limited to the particular construction that I have shown for illustrative purposes.

With this construction it will be realized that the forward end of the fuselage may be completely streamlined because of the lack of necessity for scoops beneath the motor. And it will also be realized that the location of the windshield 2 rearwardly of the forward end of the canopy will not add any air resistance to that which is incident to the presence of the windshield at the forward end of the canopy.

While I have illustrated and described the particular embodiment of my invention I do not wish to be limited to the details thereof except insofar as is necessitated by the claims, as many changes and modifications of the particular construction selected for illustrative purposes may be made within the scope of the claims and the purview of the invention.

What I claim is:

1. In an airplane fuselage including a pilot's compartment having a windshield, an air scoop extending forwardly from the windshield and having its forward open end spaced from the windshield and air inlet ducts within the air scoop.

2. In an airplane fuselage having a pilot's compartment, a windshield and canopy therefor, an air scoop formed by an extension of the canopy having its forward end open and in spaced relation to the windshield, and air inlet ducts arranged within the air scoop.

3. In an airplane fuselage including a pilot's compartment having a windshield, a canopy closing said compartment and extending forwardly of the windshield to form an air scoop and having its forward end open in spaced relation to the windshield, the outer surface of the canopy and air scoop being continuous and aerodynamically smooth, and air inlet ducts within the air scoop.

GEORGE A. MAAG.